United States Patent [19]

Weiman

[11] 3,915,526
[45] Oct. 28, 1975

[54] DRUG DELIVERY METHOD AND APPARATUS

[76] Inventor: William Weiman, 260 30th Ave., San Francisco, Calif. 94121

[22] Filed: Apr. 1, 1974

[21] Appl. No.: 456,590

[52] U.S. Cl. .............................. 312/209; 312/234.4
[51] Int. Cl.² ........................................... B01L 9/02
[58] Field of Search ........... 312/350, 209, 245, 234, 312/234.1, 234.2, 234.3, 183, 187, 208, 234.4; 221/4, 5; 116/119, 121; 206/538, 534, 539

[56] References Cited
UNITED STATES PATENTS

| | | | |
|---|---|---|---|
| 692,166 | 1/1902 | Schaffer | 116/121 |
| 794,405 | 7/1905 | Henry | 312/234.3 |
| 2,140,206 | 12/1938 | Martin | 116/119 X |
| 2,530,220 | 11/1950 | Belcher | 312/209 X |
| 3,715,148 | 6/1971 | Beals | 312/209 |
| 3,773,250 | 11/1973 | Phillips | 116/121 |

Primary Examiner—Stanley H. Tollberg

[57] ABSTRACT

A hospital drug dispensing cart is provided with discrete compartments with each of the compartments corresponding to an individual hospital patient. An individual drug dispensing tray is placed in each compartment for each patient. The trays each consist of a row of drug storage bins with an attached correspondent chart. The chart, typically attached by a hinge to the tray, is movable from a vertical storage position to a horizontal indicating and recording position. In operation, the drug dispensing cart is moved to the vicinity of the patient where the individual drug dispensing tray for that particular patient is removed. The chart attached to the tray is moved from its vertical storage position to its horizontal indicating and recording position. Dispensing information for each drug in each bin is indicated and recorded in columns which correspond in width to the corresponding width of the drug storage bin and extend away from the corresponding drug storage bin in columns on the chart. Time of drug dispensing is indicated by horizontal rows across the vertical columns on the chart for each drug storage bin. Registry of a horizontal guide with the appropriate time of the drug dispensing route for the cart produces horizontal indication underlying each drug bin of the particular drug to be dispensed.

2 Claims, 6 Drawing Figures

U.S. Patent    Oct. 28, 1975    Sheet 1 of 3    3,915,526
FIG_1
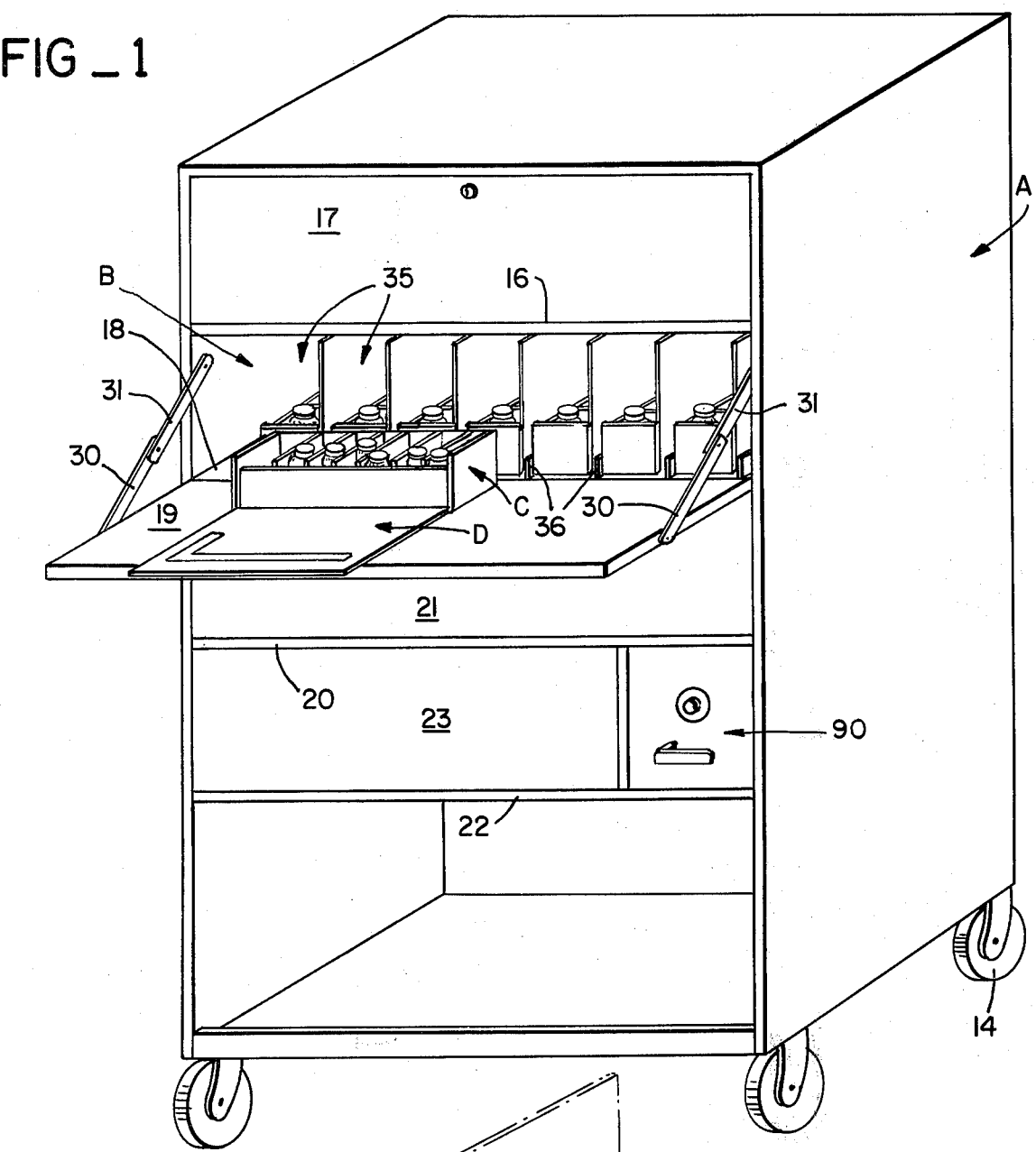
FIG_2
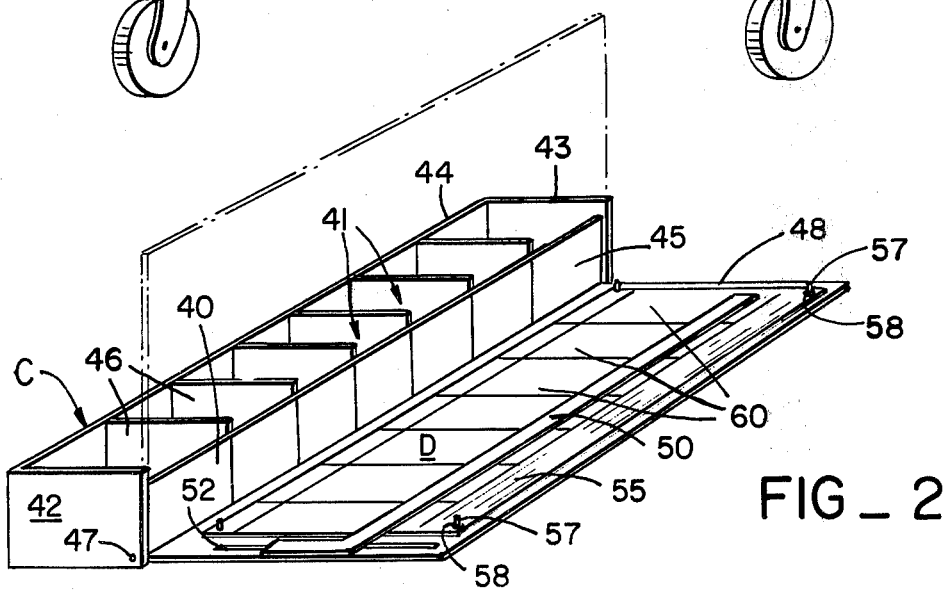

FIG-3

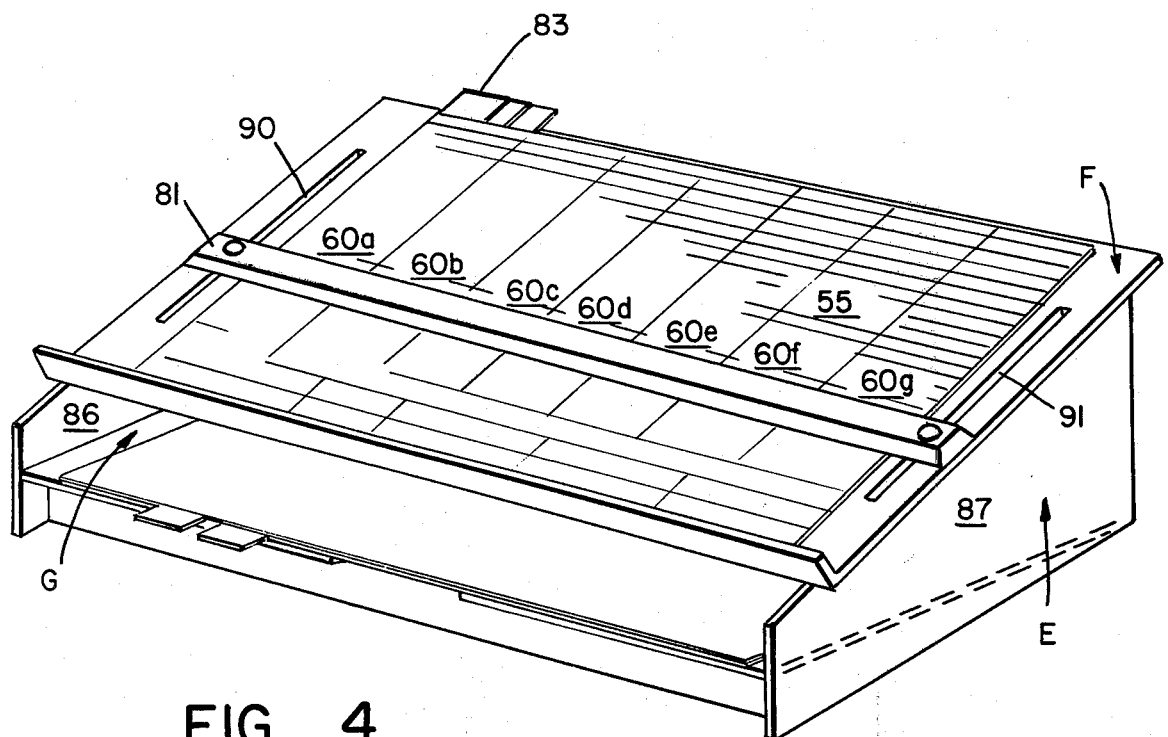
FIG_4
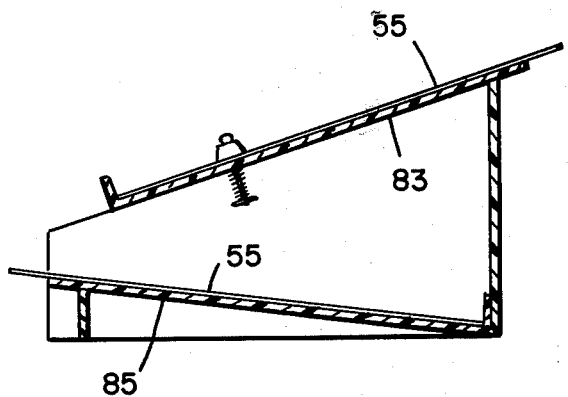
FIG_5
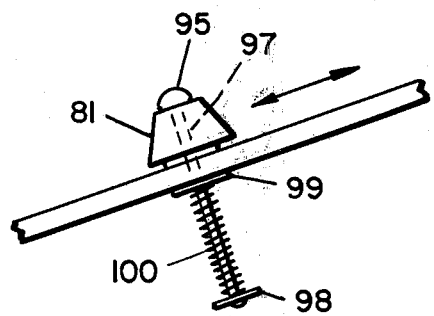
FIG_6

DRUG DELIVERY METHOD AND APPARATUS

This invention relates to containers and methods for the dispensing of drugs. More particularly, an in-hospital apparatus and in-hospital method of indicating, dispensing and recording drug dosages to patients is disclosed.

SUMMARY OF THE PRIOR ART

Modern pharmaceutical practices in the administration of drugs to patients require that drugs be accurately dispensed in the appropriate quantities at precise time sequences over a determined number of days or hours. Disruption or inadvertent substitution of the drug administered, the amount of the drug administered, or the time sequence can result in catastrophic consequences to the patient. This problem becomes acute in the high patient density areas common to hospitals, convalescent homes or other medical institutions. In these medical institutions, diminished patient capacity and correspondent increased institution responsibility requires that drug dispensing be completely removed from the patient and taken over in the entirety by the institution.

Two typical prior art systems of drug dispensing are herein discussed --the normal hospital drug dispensing system and the unit dose drug dispensing system.

Normal Hospital Drug Dispensing System

Heretofore, patient medications have been stored in bins for each patient at the nursing station. Typically, a matrix of cubby holes is provided, each cubby hole being identified by room and bed number. In dispensing medication, the nursing staff consults an index which indicates which patients receive medication at a given hour or route time. The nursing staff thereafter pulls an individual medicine card corresponding to both the patient and the particular drug to be administered. Upon location of the card, the individual medicine container is located in the patient's cubby hole where it must be selected from typically many other medicines for that patient. The correct quantity or amount of the medication is hopefully withdrawn from the standard pharmaceutical container and placed in a sub-container --usually a paper cup-- to which the identifying medicine card is attached. The dispensing nurse then departs the nursing station with the sub-containers and cards and distributes the medication to the individual patients. After distribution of the medication to the patients, the medicine cards are returned to their proper file in order to be utilized again at the next delivery of medication.

This procedure is repeated at least four times daily, consuming much time. Moreover, this system has great and proven chance for error. Drugs can be and are misdirected from one patient to another patient with coincidences of drug misdirection and patient reaction to the misdirected drugs. Catastrophic patient reactions have occurred. Moreover, the frequent errors common to this system interrupt the time sequence and correct quantity of drug administration.

Unit Dosage System

In an effort to avoid the misdirection of drugs to the patient as well as an attempt to insure more accurate drug delivery, a unit dosage system has been developed. Typically, unit doses contained in sealed dosage packets are dispensed for each patient with identifying lot number, name of drug and strength. The drug trays containing unit dose for each patient are prepared at the pharmacy, placed in a cart, and sent to the particular hospital ward. Thereafter, the carts are routed to the patients by the nurse referring to a patient index card, locating the drug in the patient's unit dose storage compartment, and dispensing and recording the administration of the drug on the patient's card, which subsequently becomes a part of the patient's record.

This system has the severe disadvantage in that it disrupts the normal pharmaceutical routine. Specially trained personnel are required to make up the cart and individual drug trays for each patient. Moreover, in order for the proper drug sequence to be maintained between dosages, the nurse must examine directions as to each drug, distinguish the drug to be dispensed from the remaining drugs in the patient's unit dosage storage compartment. This requires the use of relatively skilled drug administration personnel and can cause difficulty upon either the introduction of new drugs having changed appearance, or alternately the use of unskilled personnel in dispensing drugs.

SUMMARY OF THE INVENTION

A hospital drug dispensing cart is provided with discrete compartments with each of the compartments corresponding to an individual hospital patient. An individual drug dispensing tray is placed in each compartment for each patient. The trays each consist of a row of drug storage bins with an attached correspondent chart. The chart, typically attached by a hinge to the tray, is movable from a vertical storage position to a horizontal indicating and recording position. In operation, the drug dispensing cart is moved to the vicinity of the patient where the individual drug dispensing tray for that particular patient is removed. The chart attached to the tray is moved from its vertical storage position to its horizontal indicating and recording position. Dispensing information for each drug in each bin is indicated and recorded in columns which correspond in width to the corresponding width of the drug storage bin and extend away from the corresponding drug storage bin in columns on the chart. Time of drug dispensing is indicated by horizontal rows across the vertical columns on the chart for each drug storage bin. Registry of a horizontal guide with the appropriate time of the drug dispensing route for the cart produces horizontal indication underlying each drug bin of the particular drug to be dispensed.

OTHER OBJECTS AND ADVANTAGES OF THE INVENTION

An object of this invention is to disclose a medicine dispensing tray where each medicine in its individual storage bin is juxtaposed with a correspondent chart that indicates at a column immediately adjacent to the bin the drug to be administered as well as the quantity and exact time sequence for drug administration.

An advantage of this juxtaposition of the chart information and medicine storage bin is that the incidents of personnel confusion leading to the misdirection of drugs in kind, quantity or sequence can be reduced or eliminated.

Yet another advantage of the juxtaposition of the chart and medicine contained in the medicine storage bin is that time and labor in handling discrete medicines can be substantially reduced.

Yet another advantage of the medical storage bin and adjacent chart is that normal pharmacy routines can be adhered to. Specifically, a medicine can be dispensed in a normal pharmaceutical container without requiring special daily increments.

A further object of this invention is to disclose a chart which has registry with the discrete medical storage bin for each medicine administered to a patient.

An advantage of a chart registered with the medical storage bin is that the indication, dispensing and recording of the medicine all occur in the same localized area. Confusion caused by recording in one place and dispensing medicine from another place is eliminated.

A further advantage of the charts is registry with the storage bins is that new medications can easily and rapidly be introduced at any time in a hospital drug dispensing program. Likewise, old medicines can be easily and immediately withdrawn from a hospital drug dispensing program.

Yet another object of this invention is to organize a drug dispensing chart so that the dispensing times for separate species of drugs out of a total group of drugs carried on a drug dispensing tray are self-indicating. According to this aspect of the invention, a horizontal guide moving vertically below and indicating horizontally across each of the correspondent columns corresponding to the drug storage bins is used. This horizontal guide is registered to the time of a particular dispensing run or route. Thereafter, indicia registered with the horizontal guide indicates those vertically overlying drugs to be dispensed.

A further object of this invention is to disclose a chart which is simultaneously capable of identifying nearby medicine and later capable of becoming a permanent hospital record. According to this aspect of the invention, the chart has inscribed on it identifying information corresponding to the drug in an adjacent bin. When the time of administration is recorded on the chart and initialed by the nurse, the result is a record which, when detached from the drug dispensing tray, is capable of being integrated with permanent hospital records.

Yet another object of this invention is to disclose a chart which can be used with the existent unit dose system to provide improved drug dispensing and record keeping.

Other objects, features and advantages of this invention will become more apparent after referring to the following specification and attached drawings in which:

FIG. 1 is a perspective view of a hospital drug dispensing cart shown with its individual compartments loaded with individual patient drug dispensing trays and with one tray withdrawn from one of the compartments with its attached record open to the drug indicating, dispensing and recording position;

FIG. 2 is a perspective on an enlarged scale of the drug dispensing tray of FIG. 1 with the chart shown in phantom in the vertical storage position and shown in full lines in the indicating, dispensing and recording position;

FIG. 3 is an enlargement of the chart used with the drug dispensing tray shown in FIGS. 1 and 2 with the adjacent tray being broken away and the horizontal guide used with this invention being shown in phantom;

FIG. 4 is a perspective view of a series of charts used with a writing stand without the juxtaposition of an adjacent drug tray;

FIG. 5 is a side elevation section of the chart stand shown at FIG. 4; and,

FIG. 6 is a detail illustrating the mounting of a sliding horizontal guide to the stand illustrated in FIg. 4.

Referring to FIG. 1, cart A is shown conventionally supported on casters 14 for movement by pushing over a ward floor. The cart includes a plurality of shelves 16, 18, 20 and 22. Each of these shelves is closed by the respective shelf covers 17, 19, 21 and 23. As can be seen, shelf cover 19 is folded down into a horizontal position. It is held in this position by bars 30 and 31 at each end, which bars can be common to each and every shelf.

Shelf cover 19 exposes the interior of the cart above shelf 18. Typically, each shelf in the cart in the horizontal position is divided into a series of horizontally disposed cubby holes 35 by dividers 36. Eight horizontal cubby holes are here shown. Each of these cubby holes typically contains a medicine dispensing tray C, with its attached and juxtaposed chart D stored in the upward and vertical storage position.

Typically, when the cart is moved to a position where the dispensing of drugs to a particular patient is anticipated, the particular tray C for that patient is withdrawn from its identified cubby hole 35. Thereafter, chart D is folded downwardly to its horizontal indicating and recording position on the upward surface of the shelf 19. In this position, the dispensing of drugs can occur.

Referring to FIG. 2, a drug storage tray C is illustrated. Storage tray C includes a bottom 40, which bottom is elongate underlying the row of discrete storage bins 41 defined by the tray. In the particular tray here shown two end walls 42, 43 plus six spaced dividers 46 therebetween define the seven discrete drug storage bins 41 between a raised side wall 44 and a lower side wall 45. These bins open in a vertically unobstructed manner so that discrete drugs may be placed conveniently interiorly of discrete drug storage bins. Each drug storage tray C thus has each drug stored in a separate bin apart and aside from adjacent drugs in the same tray for the same patient.

End walls 42 and 43 are here shown extending beyond lower side wall 45. At their bottom, these respective end walls hinge to juxtaposed chart D. Typically, the hinging of juxtaposed chart D to the respective end walls occurs at pins such as pin 47 shown in end wall 42.

As can be seen in FIG. 2, each chart D includes a plastic chart board 48, a horizontal guide 50 movable over the surface of the chart board 48, and a medicine chart 55 between scale 50 and chart board 48. Horizontal guide 50 extends the width of chart D and is affixed to one of its edges to move over and along chart D towards and away from the medicine storage bins 41 at groove 52 in chart board 48. It should be noted that the mounting of horizontal guide 50 to groove 52 is conventional. For the purposes of this invention, mechanics of mounting are not important, save and except to permit medicine chart 55 to fit between the chart D and the horizontal guide 50.

It will be understood that chart D will admit of modification. For example, the information on medicine chart 55 could be directly scribed on plastic chart board 48.

Typically, medicine chart 55 is attached to the upper surface of chart D by means of protruding palls 57 from scale D and correspondent apertures 58 in chart 55.

Figure 3:
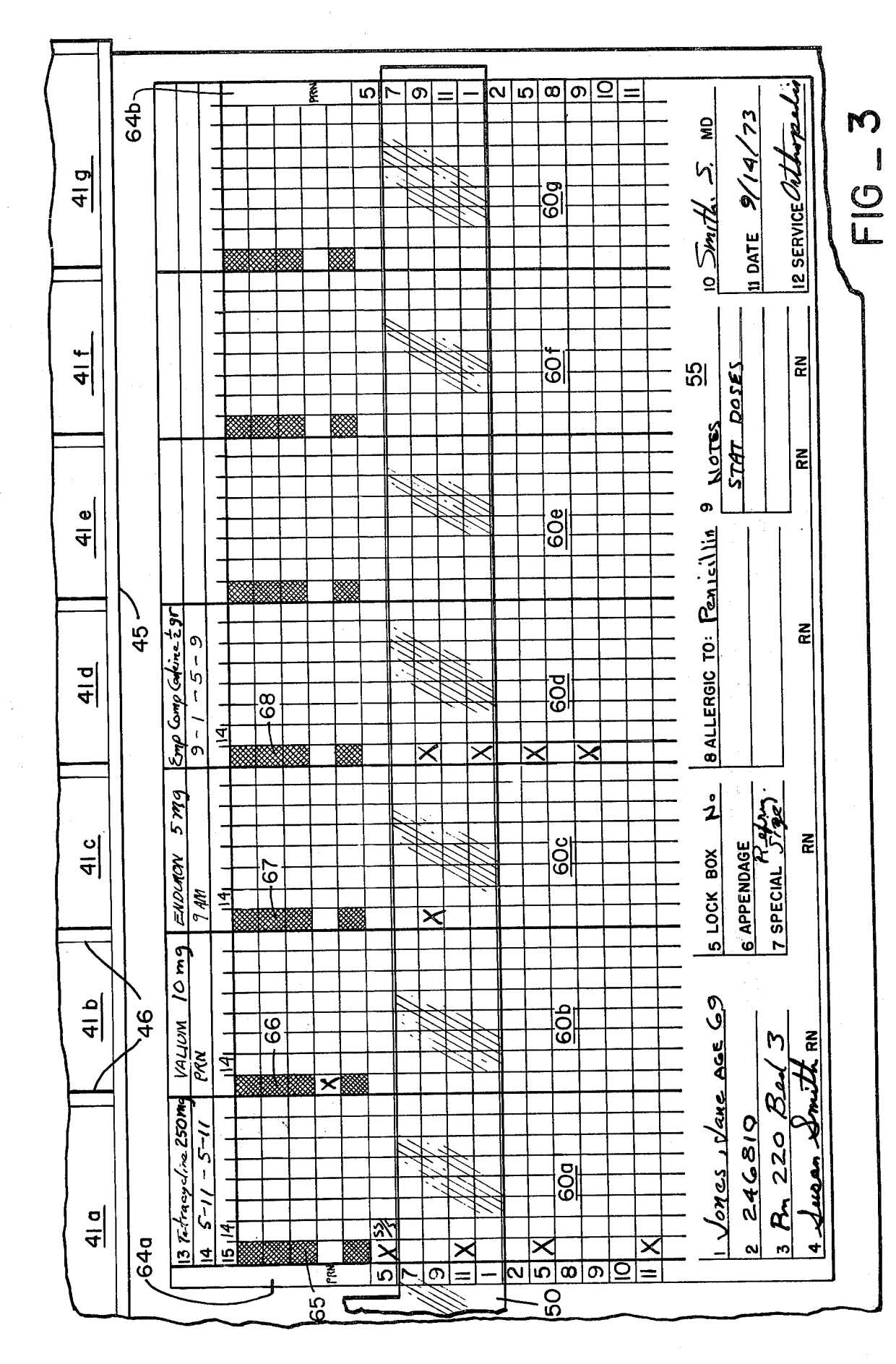

Before passing on to FIG. 3, two important details should be noted with respect to the discrete bins 41 and medicine chart 55. First, medicine chart 55 is divided into a series of discrete information containing columns 60. As can be seen, each column 60 has margins which extend substantially from and coplanarly with dividers 46. Individual indicia identifying each medication, indicating when the medicine is to be administered, as well as recording the actual administration of the medication are provided in each of the columns 60 immediate each drug storage bin 41.

Second, it will be seen that for each of the discrete columns 60 correspondent to each of the discrete drug storage bins 41, horizontal guide 50 horizontally intercepts column 60 at the same elevation. Thus, if indicia and correspondent record keeping spaces are provided at correspondent elevations on all columns 60 to indicate the time of drug administration for all individual medicines, a very useful record can result. By the expedient of moving horizontal guide 50 to a vertical position across chart D and medicine chart 55 corresponding to the time of any specific drug dispensing run or route, a readily visible indication of when a drug should be administered can be made immediate the horizontal guide 50.

Having explained the invention thus far, attention can now be devoted to the mechanics in utilizing chart D and medicine chart 55 shown in FIG. 3. Referring to medicine chart 55, it will be seen that the chart includes a series of seven vertical columns 60A through 60G. When medicine chart 55 is placed with its back on top of chart D and held in place, each of the columns corresponds in width to the width of a particular drug storage bin 41. Thus, it can be seen that the margins of the spaced columns on medicine chart 55 are coplanar with and extend away from corresponding dividers 46 between the discrete bins 41 in the drug dispensing tray C.

In addition to the vertical columns, medicine chart 55 includes a group of horizontal rows. These respective horizontal rows correspond to times when particular drugs are to be administered. Viewing left-hand most column 64a and right-hand most column 64b, it will be seen that the times of day are there recorded at corresponding elevations in each column. In the example shown here, 5, 7, 9 and 11 o'clock in the morning are recorded together with 1, 2, 5, 8, 9, 10 and 11 o'clock in the evening. Typically, each one of these recorded times corresponds to a time in the morning or the evening when a drug route is undertaken from a nursing station.

Understanding the broad construction and layout of the invention, the operation of the drug tray in combination with the chart can be understood. To explain the full use of this drug tray, recordation of identifying information on the medicine chart 55 will first be set forth. Thereafter, the placement of a drug in a storage bin with the identification of the drug on a corresponding column 60 of the medicine chart 55 will be set forth. Finally, the indication of the time the drug is administered together with the maintenance of the permanent drug record will be explained.

Referring to the medicine chart 55 at line 1, the name and age of the patient are therein recorded. At line 2 of medicine chart 55, the hospital or other identification number of the patient is set forth. Typically this information corresponds with the information contained on the patient's hospital identification band.

Referring to space 3 on medicine chart 55, the patient's geographic location in the hospital is set out. In the case herein illustrated, this is room 220, bed 3, of the hospital.

Line 4 comprises a series of line spaces for the nursing staff signatures. Reading horizontally from left to right, the nurse who initially prepares the chart will first sign her name. Thereafter, each and every nurse who uses the chart will sequentially place her full name on the chart. Later, when applicable spaces are initialed on the chart, this portion can be referred to, to correlate initials of a name with the name itself.

Referring to space 5, the notation lock box is shown. The written entry "no" means that the patient is not receiving narcotics. As narcotics are required by the law to be maintained locked in separate containers, such narcotics must be separately maintained in this system.

In the event that the patient receives narcotics, the word "yes" would be written in column 5. This would tell the administering nurse that access to a separate locked storage facility containing narcotics will be necessary to treat the patient. Such a locked storage facility is identified as container 90 shown on cart A (see FIG. 1).

Referring to blank 6, the word "appendage" appears in the chart. It is noted that some patients receive more than seven prescriptions while confined in the hospital. This space is present to indicate whether an additional storage tray, such as another storage tray C, is required for any given patient.

Referring to blank 7, it is noted that the word notation "special" is made. In the event that the patient has either refrigerated medicines or alternately medicines which are too large to fit within the normal spaces provided by the storage bins 41, notation will be made in this portion of the medicine chart 55.

Referring to space 8 on the record, allergies of the patient can be recorded. For example, the common patient allergy to pencillin, which can in many cases be fatal, is here shown recorded.

Space 9 is left for administrative notes. Such notes will include stat doses and drug reactions.

Spaces 10, 11 and 12 identify the doctor, the date the chart is initially filled out, and the hospital service —such as orthopedics, pediatrics and the like— in which the patient is confined.

Having set forth the identifying information contained on the chart, the use of the columns 60 together with the route time information contained in column 64 can now be set forth.

With the identifying information entered on medicine chart 55, a drug is placed in one of the bins 41. Assume, for the sake of example, that in the bin 41a the drug tetracycline in a 250 milligram dosage is placed with instructions for administration to the patient once every six hours commencing September 14, 1973. Referring to column 60a at line 13 on medicine chart 55, the words and numbers "tetracycline 250 mg" would be entered. On line 14 the times of drug administration would be placed. Every 6 hours in this instance translates to a 5 AM drug route, an 11 AM drug route, a 5 PM drug route and an 11 PM drug route.

It will be noted that column 60a includes a column 65. In column 65, horizontally across on the row opposite the time of the drug route, the time of administration of each drug is recorded with an X. Thus, in the case of tetracycline hereshown, four recorded X's are entered on medicine chart 55 at column elevations corresponding to the drug administration time sequence. These X's are recorded for the respective 5 AM, 11 AM, 5 PM and 11 PM drug administration times for the tetracycline prescription.

Assume additionally that patient Jane Jones has prescribed valium in 10 milligram doses on patient demand or, in hospital terminology, PRN. The valium would be placed in bin 41b. Drug identification and the demand notation are made in rows 13 and 14 respectively of medicine chart 55 at column 60b. Referring to column 60b of medicine chart 55, it will be seen that in information column 66 horizontally opposite the inscription PRN appearing in column 64, there is inscribed an X. This X means that any time that the patient should require the prescribed valium in 10 milligram doses, it will be administered.

It should be noted that the vertical portions of the chart immediately above and below the notation PRN are obscured. This is done so that the PRN portion of medicine chart 55 will stand out and be immediately obvious. Thus, demand dosages are clearly and unmistakably noted on medicine chart 55.

Referring to the third drug storage bin from the left on the drug storage tray C illustrated in FIG. 2, suppose hypothetical patient Jane Jones requires the drug Enduron to be administered once a day at the 9 AM drug route. Her prescription of Enduron would be placed in the third from the left drug storage bin 41c. An entry of the drug name "Enduron, 5 mg." would be made on line 13, column 60c, together with the time of drug administration, 9 AM, being inscribed on line 14 of column 60c. Thereafter, an X would be inscribed in column 60c along information column 67.

Finally, let us assume the patient is prescribed the drug Empirin Compound with codeine, ½ grain, to be administered 4 times a day. The drug would be placed in the fourth from the left bin 41d. An entry of drug name and strength would be made on line 13 of column 60d together with the time of administration (9 AM- 1 PM- 5 PM- 9 PM) on line 14 of column 60d. As is indicated in information column 68 of column 60d, correspondent X's will be entered at the appropriate drug route times.

It should be noted that the example hereshown includes a patient being administered a total of four drugs. It should be appreciated that an average of five to six drugs are often given to patients undergoing care in a hospital. Thus, the need for a systematized administration of drugs such as that hereshown should be apparent especially where complete institutional responsibility for this drug administration must be assumed in a high patient density area.

Having placed the drugs in their appropriate bins 41a through 41d, and having correspondently recorded the name and drug route administration times in columns 60a through 60d, the in-hospital operation of this apparatus can now be understood.

Referring to medicine chart 55 at line 15 and the information appearing horizontally opposite, medicine chart 55 will be kept in seven day intervals. Typically, the first day of the month in which the chart is made out will be filled in each of the seven unfilled columns of drug columns 60a through 60d. In the case hereshown, Sept. 14, 1973 is noted by the numeral 14 being placed in the left-most vertical column at horizontal line 15 on medicine chart 55.

At the hour medicines are to be passed, the administering nurse will typically wheel cart A to the vicinity of the hypothetical patient, Jane Jones. Thereafter, folding shelf 19 will be opened and the drug tray C for patient Jane Jones will be removed from its respective space 35 as shown in FIG. 1. Chart D will be folded downwardly and into the horizontal position shown in FIG. 2. Thereafter, horizontal guide 50 will be moved horizontally to the time of the particular drug route, to wit, 5 AM. (See FIG. 3.) Horizontal guide 50 now underlies the number 5 in left-hand information column 64, and immediately underscores the X appearing under tetracycline. When the tetracycline is administered, she will inscribe her initials and the actual time in the square opposite the X for tetracycline and immediately under the vertical 14 for the 14th of September. This is done when the drug is administered, and provides a record for recording the administration of the drug. Note that the juxtaposition of the tetracycline (see bin 41a) to the instructions (see column 60a) made an error extremely unlikely.

Having explained the invention thus far, the remainder of its application should be immediately apparent. As can be seen, horizontal registry of a horizontal guide 50 at the time 7 AM will swiftly indicate that no drugs are required.

Likewise throughout the day, the drugs Enduron and Empirin Compound with codeine will be administered at 9 AM, tetracycline at 11 AM, Empirin Compound with codeine at 1 PM, tetracycline and Empirin Compound with codeine at 5 PM, Empirin Compound with codeine at 9 PM, and tetracycline at 11 PM. As each drug is administered, a nurse who has not previously administered drugs to the patient will sign her name and initial appropriate blanks and indicate the actual time of administration. Valium will be administered when required.

It will be apparent that the improved record keeping ability of the medicine chart 55 renders it useful independent of any juxtaposition to drug storage bins 41. According to this latter aspect of the invention, and with reference to FIGS. 4–6, an embodiment of the chart and horizontal guide of this invention is illustrated.

Referring to FIGS. 4 and 5, a chart stand E is illustrated having an upper chart supporting surface F and a lower chart storage compartment G.

A horizontal guide 81 is movable in horizontal relation over the surface of a medicine chart to provide for the indication of dispensing and drug administration recording areas as previously described.

The stand includes an upper chart supporting member 83, preferably inclined from the horizontal, with chart 55 disposed thereon. Typically, chart 55 is disposed with drug identification line 13, time of drug administration line 14 at the top or elevated portion of member 83, and with the columns 60A-60G extending downwardly and at right angles to the horizontal guide 81.

Chart storage bin G includes a lower shelf 85. Shelf 85, inclined from the horizontal approximately equally and opposite to the slope of member 83, provides for the convenient storage of medicine chart 55 either before or after their use.

Discrete medicine charts 55 can be classified from adjacent similar medicine charts 55 by the use of tabs 82. Tabs 82 can refer to room numbers, bed numbers, patient numbers or other convenient identification information dependent upon the type of medical institution in which the records are used.

Maintaining member 83 and shelf 85 in their respective inclined positions are two side members 86 and 87 which at the same time furnish the base on which the stand rests.

Horizontal guide 81 is mounted for horizontal movement over the surface of member 83. This occurs at opposed slot 90, 91 by means of a spring biased non-threaded bolt 95. Bolt 95 passes through bar 81 at an aperture 97. A washer 98 keyed to the lower portion of non-threaded bolt 95, and a movable washer 99 riding about bolt 95, have spring 100 captured therebetween. Typically, spring 100 is under compression and provides for a frictional movement of the horizontal guide 81 over the surface 83 which supports medicine chart 55.

Operation of the chart is precisely analogous to the operation previously described, giving a rapid and accurate readout of the drugs to be administered at a given hour.

I have illustrated what I believe to be the best embodiment of my invention. It will be understood by those skilled in the art that many modifications can be made to the particulars of my invention. For example, although I have used a chart with one type pattern of recordation of drug administration indicia, other vertical columns containing correspondent information can be employed. It is, however, essential to this invention that a record be provided which immediately adjacent each bin unmistakably identifies drugs in the adjacent bins. Moreover, it is preferred that the columns be divided into horizontal drug route rows, which rows can carry suitable identification for drug administration as well as spatial intervals in which the administration of the drug can be recorded to the patient. Likewise, other modifications may be made to my invention without departing from the spirit of this invention.

I claim:

1. A drug storage tray with attached chart comprising: an elongate tray for supporting a plurality of discrete drug containers thereon; a series of partitions extending across said elongate tray to delimit the length of said tray into a series of discrete drug bins for receiving discrete drugs in each bin; a chart; means for attaching said chart to said drug storage tray with a portion of said chart juxtaposed to each said drug storage bin; discrete columns on said chart having column margins extending from each discrete bin proximate the partitions delimiting each bin to define columns on said chart between said margins having a width substantially equal to the width of each discrete storage bin at the point of juxtaposition of said chart; and, defined areas on said chart at each discrete column for receiving indicia for identifying each drug in each discrete bin as to drug identity and time of daily drug administration, and a horizontal guide movable on said chart across all columns of said chart at preselected distances from the point of juxtaposition of said chart to said discrete drug storage bins; said defined areas containing indicia at correspondent distances for correspondent times of daily drug agministration from each discrete drug storage bin.

2. A process for administering drugs to a group of hospital patients comprising: providing an elongate tray for each of said group of hospital patients, said tray including a series of partitions extending across said elongate tray to delimit the length of said tray into a series of discrete drug storage bins; attaching a chart to said drug storage tray with a portion of said chart juxtaposed to each said drug storage bin, said chart including discrete columns on said chart having column margins extending from each discrete bin proximate the partitions delimiting administration bin to define columns on said chart between said margins having a width substantially equal to the width of each discrete storage bin at the point of juxtaposition of said chart; placing a supply of a discrete drug in an amount sufficient for multiple administrations in at least one of said drug storage bins for administration to said one of said group of hospital patients at a preselected time sequence; and, recording on said chart in the column adjacent each bin the drug identity and drug administration preselected time sequence for the administration of said drug, providing a horizontal guide movable over all of said columns in a path whereby each of said columns is intercepted at an equal distance from each one of said storage bins by said horizontal guide; and, moving said horizontal guide to indicate said preselected time sequence recorded on said chart.

* * * * *